(12) United States Patent
Vaughan

(10) Patent No.: US 10,472,251 B2
(45) Date of Patent: *Nov. 12, 2019

(54) FLUID TREATMENT TANK HAVING A DISTRIBUTOR PLATE

(71) Applicant: Clack Corporation, Windsor, WI (US)

(72) Inventor: Don Vaughan, Waunakee, WI (US)

(73) Assignee: Clack Corporation, Windsor, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,062

(22) Filed: Oct. 23, 2018

(65) Prior Publication Data

US 2019/0055137 A1 Feb. 21, 2019

Related U.S. Application Data

(63) Continuation of application No. 15/134,863, filed on Apr. 21, 2016, now Pat. No. 10,106,434.

(60) Provisional application No. 62/151,022, filed on Apr. 22, 2015.

(51) Int. Cl.
| | |
|---|---|
| *B01D 24/12* | (2006.01) |
| *C02F 1/00* | (2006.01) |
| *B01D 15/22* | (2006.01) |
| *C02F 1/42* | (2006.01) |
| *B01J 47/022* | (2017.01) |

(52) U.S. Cl.
CPC .............. *C02F 1/006* (2013.01); *B01D 15/22* (2013.01); *B01D 24/12* (2013.01); *B01J 47/022* (2013.01); *C02F 1/42* (2013.01); *C02F 2201/002* (2013.01)

(58) Field of Classification Search
CPC ...... C02F 1/006; C02F 1/42; C02F 2201/002; B01D 15/22; B01D 24/12; B01D 39/1692; B01J 47/022
See application file for complete search history.

(56) References Cited

U.S. PATENT DOCUMENTS

| | | | |
|---|---|---|---|
| 3,557,827 A | 1/1971 | Marsh | |
| 4,536,287 A * | 8/1985 | Himsley | ................ B01J 47/022 210/293 |
| 5,157,979 A | 10/1992 | Brane et al. | |

(Continued)

OTHER PUBLICATIONS

Product Data Sheet for NORYL GFN3 Resin manufactured by Sabic Company. Retrieved from the Internet:<https://pc-api-public.sabic.com/uploads/92fadfe4/5c62/e711/80fb/005056857ef3/NORYL%E2%84%A2%20%20Resin_GFN3_Europe_Technical_Data_Sheet.pdf> (Year: 2019).*

*Primary Examiner* — Matthew O Savage
(74) *Attorney, Agent, or Firm* — Boyle Fredrickson, S.C.

(57) ABSTRACT

A distributor plate for a fluid tank such as a water softener pressure vessel separates the resin bed from a lower end of the resin tank. The distributor plate includes a disk that is supported on an upwardly facing surface from below and that is restrained from upward motion by a weld bead located above an outer periphery of the disk. The disk may have an inner slotted plate portion and an outer portion, and wherein the outer portion of the disk has an upper surface having an annular protrusion extending above an upper surface of the slotted plate portion, with an upper surface of the protrusion forms an engagement surface for the weld bead. The disk may be formed from a thermoplastic material having a relatively high dimensional predictability such as high-density polyethylene (HDPE) and unfilled or 30% glass-filled Noryl®, respectively.

13 Claims, 5 Drawing Sheets

(56) References Cited

U.S. PATENT DOCUMENTS

| | | |
|---|---|---|
| 5,378,370 A | 1/1995 | Brane et al. |
| 5,827,427 A | 10/1998 | Hansen |
| 7,810,670 B2 | 10/2010 | Carter et al. |
| 7,963,400 B2 | 6/2011 | Stolarik et al. |
| 8,110,103 B2 | 2/2012 | Mormino et al. |
| 10,106,434 B2 * | 10/2018 | Vaughan ................. C02F 1/006 |

* cited by examiner

FLUID TREATMENT TANK HAVING A DISTRIBUTOR PLATE

CROSS REFERENCE TO A RELATED APPLICATION

This application is a continuation of U.S. patent application Ser. No. 15/134,863; Filed Apr. 21, 2016, which claims priority under 35 USC § 1.119(e) to earlier U.S. Provisional Patent Application. Ser. No 62/151,022, filed Apr. 22, 2015 and entitled DISTRIBUTOR ARRANGEMENT FOR A FLUID TREATMENT TANK, the contents of each of which are incorporated by reference in their entirety.

BACKGROUND OF THE INVENTION

1. Field of the Invention

The invention generally relates to fluid treatment tanks and, more particularly, to a tank that has a fluid-permeable distributor plate and that can be easily manufactured and assembled with high dimensional precision. The invention additionally relates to such a distributor plate and to a method of making a fluid treatment tank including such a distributor plate.

2. Discussion of the Related Art

Fluid-permeable plates, generally known as "distributor plates," are widely used in a variety of fluid treatment tanks. These tanks typically are known as "pressure vessels" because the fluid may be pressurized, albeit usually at a low pressure. One such tank is a pressure vessel known as a "resin tank" of a water treatment system. The typical resin tank is a hollow cylindrical structure the interior of which defines a resin bed configured to store "resin" and water or another liquid therein. The resin may be provided in the form of a plurality of plastic, e.g., polystyrene, beads. The resin bed is separated from the bottom of the tank by a slotted, perforated, or otherwise fluid permeable distributor plate that permits bidirectional fluid flow therethrough, but which prevents resin from falling through the distributor plate. A riser tube may be centrally positioned within the tank. The typical riser tube extends from the distributor plate to an upper opening in the tank through which treated liquid exits the resin tank. The tank may include a blow-molded plastic tank liner reinforced by an outer layer of fiberglass wrap.

The typical distributor plate is a unitary thermoplastic structure that is thermally welded or otherwise thermally bonded to the inner wall of the tank liner. Because materials having highly-dissimilar melting points cannot be reliably thermally bonded to one another, and for cost and ease of manufacturing considerations, the typical distributor plate is formed from the same general type of material as the pressure vessel liner to which it is bonded, most typically a high-density polyethylene (HDPE).

HDPE is easy to injection-mold into virtually any desired shape, but experiences relatively low dimensional stability because it has a relatively high "shrink rate." The shrink rate or "shrinkage ratio" is a measurement of shrinkage occurring when a molten polymer cooling in a mold contracts as its temperature drops. Shrink rate typically is described either in terms of linear distance per linear distance or percentage. Rated shrink rates, as measured in accordance with ASTM standard D955, vary significantly from material-to-material and within particular materials. HDPE, for example, has a shrink rate of 0.015 to 0.040 in/in or 1.5 to 4.0%. Unfilled Noryl® (Noryl® lacking glass or otherwise being unreinforced) on the other hand, has a shrink rate of 0.005 to 0.007 in/in or 0.5 to 0.7%, and 30% glass-filled Noryl® (Noryl® which is reinforced with glass) has a shrink rate of 0.001 to 0.003 in/in or 0.1 to 0.3%. HDPE also has a much lower viscosity than unfilled or glass-filed Noryl® and requires extremely tight tools to prevent the plastic from flowing into small gaps in the tools during the injection-molding process.

The low dimensional stability exhibited by HDPE can hinder the injection molding of relatively fine distributor plate features such as slots. Such slots typically are formed during the injection molding process by thin fins extending vertically from one of the halves of a mold. The nominal slot width may be on the order of 0.25 mm to 0.33 mm. The relatively high shrink rate of HDPE and resultant low dimensional stability can lead to significant variations of slot width between slots and even within slots in a molded distributor plate. In the most extreme example, because of the low viscosity of HDPE, variations from the endpoints of this nominal dimension of up to 0.5 mm may occur "Flashing" may occur in these instances, resulting in a thin layer of material or "flash" completely closing some of slots, preventing fluid flow through them during subsequent operation of the system. Slots may also warp or otherwise distort. Hence, it is usually difficult or impossible to maintain close tolerances of fine features molded from a material having a high shrink rate.

High shrink rate variation also hinders precision molding fine features. That is, if a material has a hypothetical shrink rate of 4%, but that shrink rate does not vary by more than +/−0.5% from lot-to-lot or within a particular mold, die dimensions and other mold properties possibly could be designed to compensate for the predicted shrinkage while still retaining acceptable dimensional stability with relatively close tolerances of molded product features. However, such compensation is difficult or impossible for materials having a low "dimensional predictability" or dimensional stability on a highly repeatable basis due to its high "heat shrink rate variability." The "heat shrink rate variability" of a material is defined herein as the difference between highest shrink rate and the lowest shrink rate of that material as measured in accordance with an industry accepted standard such as ASTM D955. For example, HDPE has such a high shrink rate variability (on the order of +/−2.5%) that it is difficult, if not impossible, to adequately predict for shrinkage when designing the mold and the molding process properties to prevent undesired variations in slot width, shape, and/or orientation. HDPE thus has a low dimensional predictability.

The need therefore has arisen to provide a fluid treatment tank having a distributor plate they can be easily mounted to the wall of the tank but that can be injection-molded with a high level of dimensional predictability so as to assure that the widths of the apertures in a distributor plate or other fine molded features remain within tolerances.

BRIEF DESCRIPTION

In accordance with a first aspect of the invention, one or more of the above-identified needs is met by providing a fluid treatment tank such as a water softener pressure vessel that includes a distributor plate that separates the resin bed from a lower end of the resin tank. The distributor plate includes a disk that is supported on an upwardly facing surface from below and that is restrained from upward motion by a weld bead located above an outer periphery of the disk. The disk may have an inner slotted plate portion and an outer portion. The outer portion of the disk may have an upper surface having an annular protrusion extending above an upper surface of the slotted plate portion, with an upper surface of the protrusion forms an engagement surface for the weld bead. The disk may be formed from a thermoplastic material having a relatively high dimensional predictability such as high-density polyethylene (HDPE) and unfilled or 30% glass-filled Noryl®, respectively.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Distributor plates constructed in accordance with the invention could be used in a variety of tanks configured to treat a variety of fluids using any of a number of media. Hence, while preferred embodiments of the invention now will be described in conjunction with a resin tank of a water treatment system, it is to he understood that the invention is not so limited.

Figure 1:
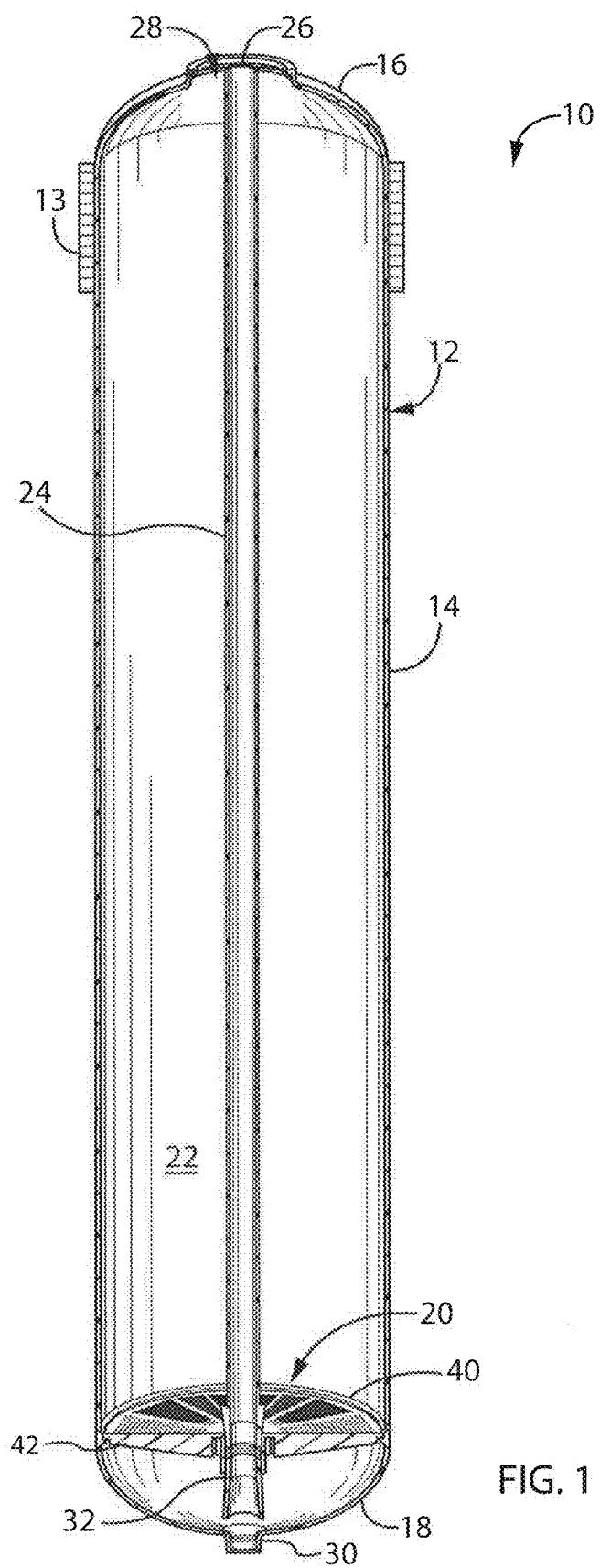
FIG. 1 is a sectional side elevation view of a water softener pressure vessel including a two-part distributor plate according to an embodiment of the present invention.

Referring now to the drawings and, initially, FIG. 1, a resin tank 10 includes a tank liner 12 reinforced with wound fiberglass 13 (only a portion of which is shown in FIG. 1). One of variety of water treatment systems with which the resin tank 10 is usable is disclosed in U.S. Pat. No. 6,402,944, the contents which are incorporated herein by reference.

The tank liner 12 is made of a thermoplastic material such as blow-molded high-density polyethylene (HDPE). Liner 12 includes a generally cylindrical hollow body or wall 14 and upper and lower generally semi-spherical top and bottom ends 16 and 18. A feature 30 is integrally molded to the bottom end 18 of the liner 12 to rotationally couple the liner 12 to the filament winding machine during the fiberglass winding process The body 14 may have an internal diameter of, for example, 20 cm to 40 cm and a height of 0.5 m to 2 m. A distributor plate 20 is provided in the liner 12 near the bottom end 18 to define a resin bed storage area 22 above the distributor plate 20. Area 22 contains a bed or layer of a resin or other water treatment media during use of the tank 10. The resin may be provided in the form of a plurality of plastic, e.g., polystyrene, beads. A riser tube 24 may be centrally positioned within the tank 10. Riser tube 24 includes an upper end 26 that extends through an upper opening 28 of the resin tank 10. Treated water exits the resin tank 10 via tube 24 during normal operation. The remainder of the opening 28 concentrically surrounding the riser tube 24 forms an inlet port for the flow of hard water during normal operation. An inlet tube 32, positioned beneath the lower end of the riser tube 24, extends downwardly through the distributor plate 20 in communication with the lower end portion of the tank 10. Each slot could be of a uniform width along its depth or one or both sides of each slot could taper linearly or curvilinearly outwardly through at least a portion of its depth to encourage any solid material that falls into the slot to drop through the slot without clogging it.

Figure 2:
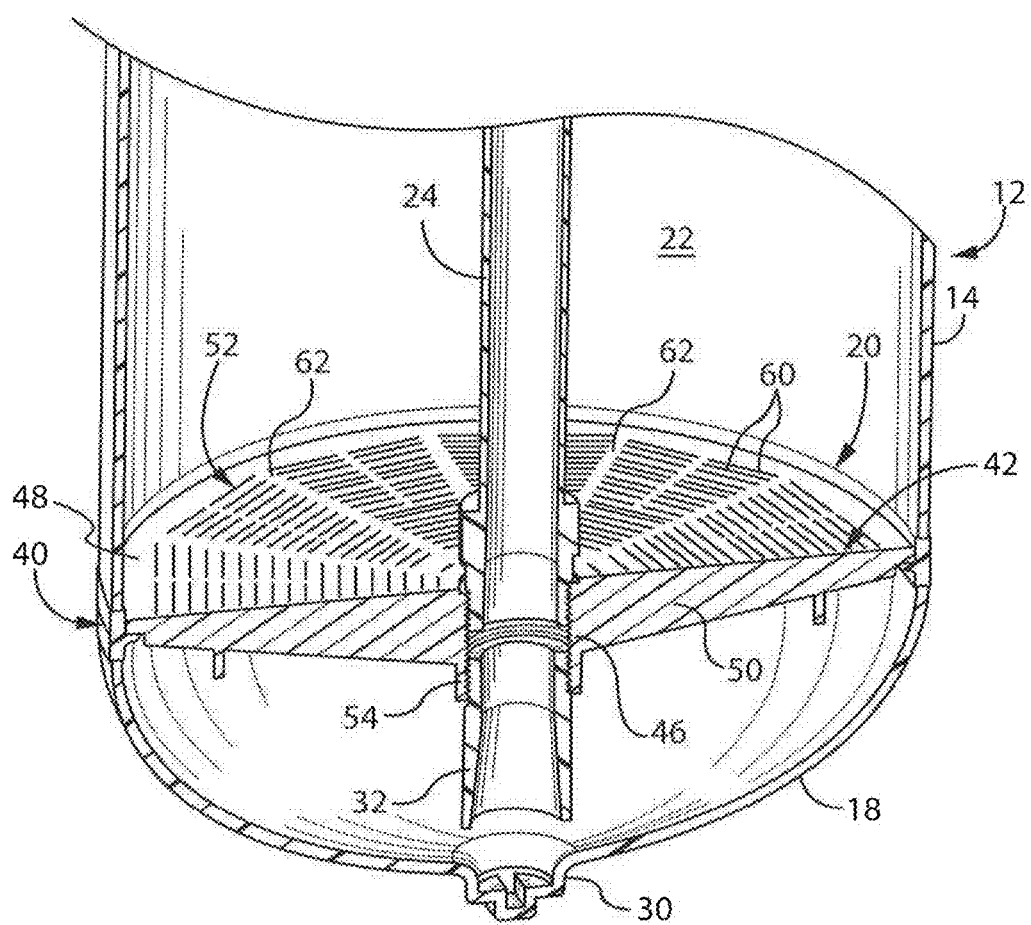
FIG. 2 is a sectional side elevation view of a lower end portion of the water softener pressure vessel of FIG. 1.

With additional reference now to FIGS. 1 and 2, the distributor plate 20 is shown in additional detail. The distributor plate 20 is a two-component assembly including an outer ring 40 mounted on the tank liner wall 14 as described below and an inner disk 42 supported on the ring 40.

Referring particularly to FIG. 2, the disk 42 includes a central hub portion 46 through which the riser tube 24 and the inlet tube 32 are received, an outer ring portion 48, a plurality of circumferentially-spaced reinforcing ribs 50 extending at least generally radially from the hub portion 46 to the outer ring portion 48, and a slotted plate portion 52 supported on the ribs 50 and extending from the hub portion 46 to the outer ring portion 48. The hub portion 46 is internally threadedly and coupled to the riser tube 24. An internally threaded flanged portion 54 extends downwardly from the hub portion 46 for connection to the inlet tube 32.

Figure 3:
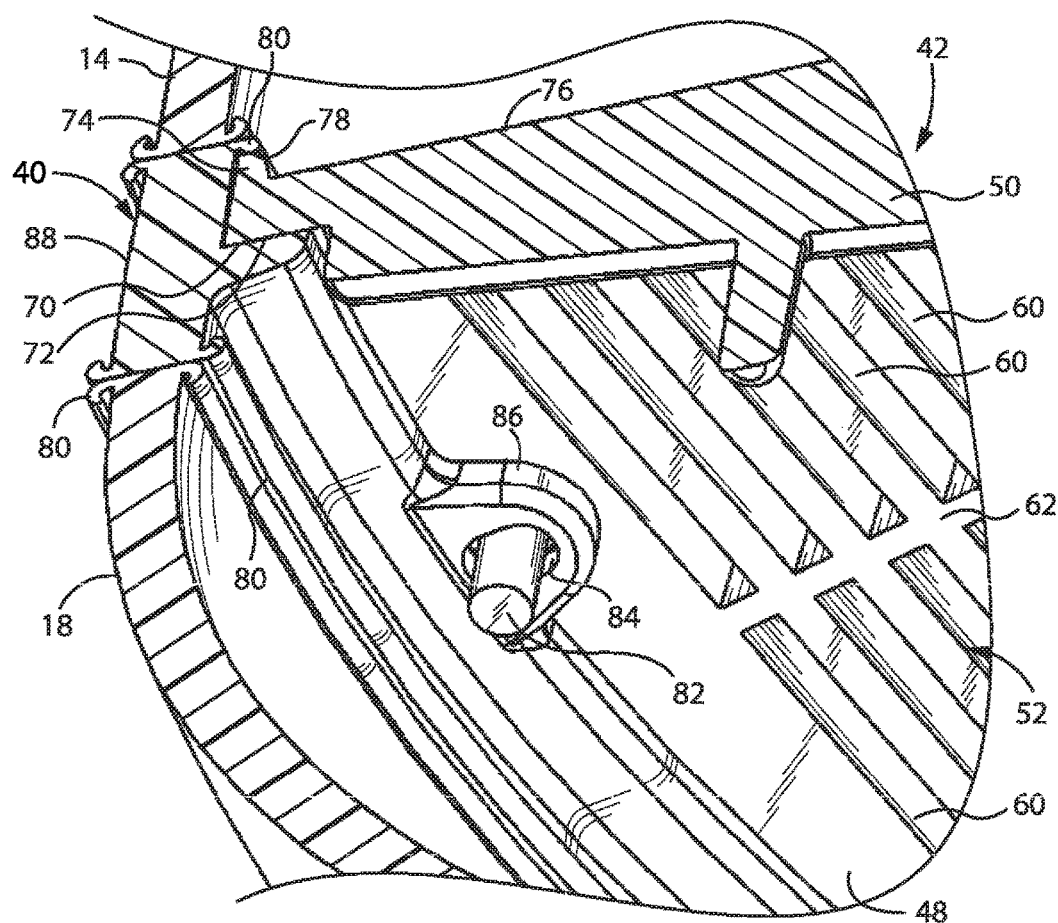
FIG. 3 is a fragmentary isometric view side view of a bottom end portion of the pressure vessel, showing the connection of the distributor plate disk to the distributor plate ring.
Figure 4:
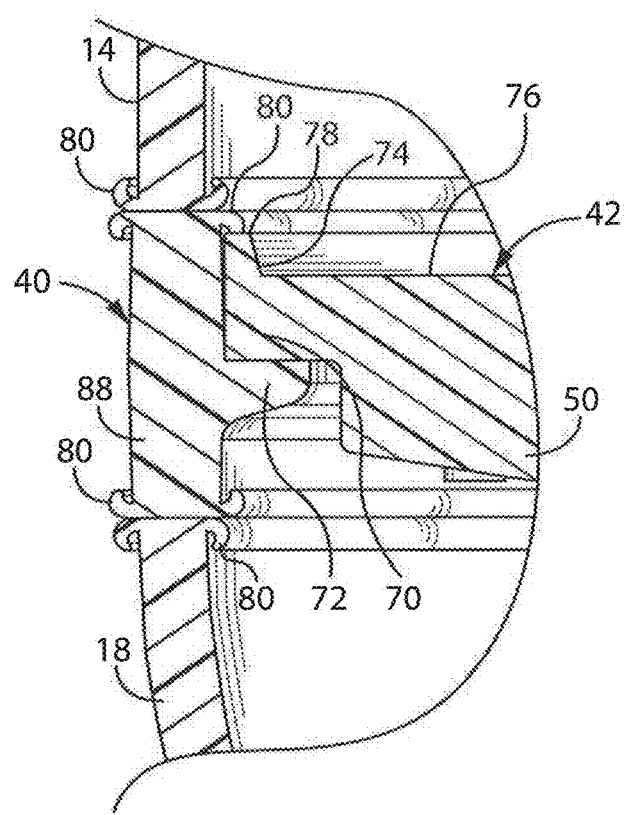
FIG. 4 is a fragmentary sectional side view of the bottom end of the pressure vessel.

Referring now to FIGS. 2-4, a plurality of slots 60 are formed in the slotted plate portion 52 of distributor plate 20. The slots 60 are sized, shaped, and orientated to promote uniform fluid flow through the distributor plate 20 and the resin without being clogged with the resin beads or other media particles. The slots 60 could be relatively straight slots that extend either radially or tangentially, or could be curvilinear, such as generally spiral-shaped. The "slot density" or proportion of the total area of all slots 60 to the total area of the slotted plate portion 52 also can vary considerably from application to application. In addition, one or more of the slot size, slot shape, slot orientation, and slot density can vary across the radius of a given slotted plate portion 52 to contribute to a desired flow distribution across the radius of the tank 10. Each slot 60 should be wide enough to permit the fluid being treated and other fluids such as brine to pass therethrough but narrower than the smallest diameter bead or other particle forming the treatment media.

In the illustrated embodiment, the slots 60 are straight slots that extend tangentially and are arranged in a plurality of concentric rings around the circumference of the slotted plate portion 52, with radially-extending spokes 62 separating the slots 60 in each ring. The spokes 62 overly and are coincident with some of the ribs 50. The illustrate slots 60 are configured for use with media of a "medium" coarseness. Each slot 60 is on the order of 0.25 mm to 0.33 mm wide and between 7.5 mm and 25 mm long, with the slots 60 that are closer to the center of the slotted plate portion 52 being shorter than the slots 60 that are further from the center of the slotted plate 52. The radial spacing between the slots 60 of each ring is on the order of 2.0 mm and 4.0 mm. In applications counseling for "narrow" slots for use with media of finer coarseness, typical slot width would be 0.18 to 0.25 mm. In applications counseling for "wide" slots for use with coarser media, typical slot width would be 0.40 to 0.50 mm. In each case, the "average slot width," defined as the average width of substantially all slots, varies by no more than about 0.1 mm within a given disk or from disk to disk for slots formed in a mold having a particular slot-forming fin configuration.

The disk 42 of this embodiment is mounted on the ring 40 in a manner that at least essentially prohibits axial movement of the disk 42 relative to the ring 40 during normal use and operation of the tank 10, but that permits some radial movement therebetween in order to accommodate some radial flexing or bulging of the wall 14 relative to the disk 42 of the distributor plate 20. Referring now to FIGS. 3 and 4, the outer ring portion 48 of the disk 42 is stepped to form a downwardly-facing horizontal annular flange 70 that rests upon a mating upwardly-facing surface such as a horizontal annular flange 72 extending inwardly from an inner surface of the ring 40. This mating engagement should be provided through a sufficiently large area to reliably support the combined weight of the disk 42 and the resin on the ring 40. A radial length of 4.5 mm to 5 mm will suffice in the present example. The upper surface of the disk 42 could be planar or, as in the illustrated embodiment, could have an annular protrusion 74 at outer ring portion 48 extending a relatively small distance of on the order of 2.0 mm to 2.5 mm above the adjacent upper surface 76 of the slotted plate portion 52. The upper end of this protrusion 74 forms an engagement surface 78 for engaging a flash bead 80 that is formed during a hot plate welding operation detailed below. Engagement or close proximity of the flash head 80 with the engagement surface 78 of the protrusion 74 prevents significant vertical movement of the disk 42 relative to the ring 40 during system operation.

Referring to FIG. 3, the disk 42 may additionally be retained to the ring 40 by a plurality of circumferentially-spaced pins 82 that extend downwardly from the bottom surface of the outer-ring portion 48 of the disk 42 and through holes 84 formed in ears 86 extending inwardly from the inner surface of the flange 72 on the ring 40. Three or more such pins 82 may be equally spaced around the perimeter of the disk 42. Frictional engagement of the pins 82 with the side edges of the holes 84 helps retain the disk 42 in place on the ring 40, particularly during initial manufacture of the tank liner 12 before the inner flash bead 80 has been formed. The holes 84 may take the form of radially-elongated slots. In this case, after manufacturing and assembly, the desirable relative radial movement between the disk 42 and the ring 40 is permitted by radial movement of the pins 82 within the elongated slots 84. This radial movement may be, for example, on the order of 0.25 mm to 0.5 mm. The pin/slot configuration or any other comparable fixturing mechanisms need not be present at all if other mechanisms are utilized to hold the disk 42 and ring 40 together during assembly. For example, the disk 42 can be held into the ring 40 by fixturing it on the hot plate bonding machine, negating the need to provide for pins or other fixturing strictures holding the disk and ring together during tank assembly.

Still referring to FIGS. 3 and 4, the ring 40 has a cylindrical body 88 from which the aforementioned flange 72 extends. The body 88 may have an axial length of on the order of 16 mm and a thickness that is equal to or slightly greater than that of the wall 14 of the tank liner 12. Body 88 is hot plate bonded to the liner body 14 at its upper end and to the liner bottom end portion 18 at its bottom end. This bonding produces beads 80 of weld flash on the ring 40 as well as on the mating ends of the tank liner sections 14 and 18. The afore-mentioned bead 80 of weld flash that is adjacent the upper surface 78 the protrusion 74 on the disk 42 typically is on the order of 0.5 mm to 1.0 mm thick and provides ample holding force to prevent axial movement of the disk 42 relative to the ring 40.

This two-part distributor plate construction 1) permits the ring 40 to be injection-molded from a thermoplastic material that is relatively-easily thermally-bonded to the tank liner 12 but that has a relatively low dimensional predictability, while 2) permitting the disk 42 to be injection-molded from a thermoplastic material that cannot be easily welded to the material of the tank liner 12 but that has a relatively high dimensional predictability. "Dimensional predictability" in this regard refers to a material that can be injection-molded with fine features of on the order of a less than a centimeter and as fine as a few tenths of a millimeter with close tolerances and with high repeatability on a shot-by-shot basis over a relatively large number of shots. High "dimensional predictability" is generally inversely related to shrink rate and is even more closely inversely related to shrink rate variability. Shrink rate and shrink rate variability are discussed in more detail below. Forming the disk 42 from a material having a relatively high dimensional repeatability when compared to that of a material that can thermally bonded to the tank liner wall 14 permits the slots 60 and other fine features on the distributor plate 20 to be made reliably with close tolerances.

In the illustrated embodiment in which the tank liner 12 is made of a blow-molded, high-density polyethylene (HDPE), the ring 40 also is preferably made from a high-density polyethylene (HDPE), albeit one that can be injection-molded. In order to make the tank liner 12 and ring 40 from as similar of materials as practical, the tank liner 12 is made from a material of a molecular weight that is on the high end of the range of suitable molecular weights for blow-molding, and the material of the ring 40 is of a molecular weight that is on the low end of the range of suitable molecular weights for blow-molding that can be injection-molded. One example of an acceptable ring material is available through Lyondelbasell under the moniker Petrothene LT5704.

In the present embodiment in which the slots 60 have a width of on the order of 0.25 to 0.33 millimeters, in order to provide the desired high dimensional predictability, the material chosen for the disk 42 should have a shrink rate variability of less than 0.5% and more preferably of less than 0.25%. An acceptable material is unfilled or glass-filled Noryl®. Noryl® is a registered trademark of Sable Innovative Plastics IP B.V. Noryl® is family of amorphous reinforced materials in the form of modified polyphenylene ether resins that are formed from amorphous blends of polyphenylene ether resin and polystyrene. According to Sable, they combine the inherent benefits of polyphenylene ether resin, including being relatively affordable, high heat resistance, good electrical properties, excellent hydrolytic stability and the ability to use non-halogen FR packages, with excellent dimensional stability, good processability and low specific gravity. Low mold shrinkage is also touted as a beneficial characteristic of Noryl® on the manufacturer's website: https://Awwuw.sabic:ip.com/gep/Plastics/en/ProductsAndServices/ProducLine/norvl.html. Other amorphous reinforced materials having acceptable combinations of high dimensional predictability and strength also could be acceptable, as could glass-reinforced acrylonitrile butadiene styrene (ABS), polyetherimide (PEI), or polyphenylene sulfide (PPS).

The specific material of the present embodiment is 30% glass-filled Noryl®, with a particularly-preferred form of Noryl® being available from Sabic under the moniker GFN3. This 30% glass filled Noryl® has a shrink rate as measured in accordance with ASTM D955 of 0.1% to 0.3% and thus a shrink rate variability, or difference between highest shrink rate as measured in accordance with ASTM D955 and lowest shrink rate, of 0.2% (0.3%-0.1%). This low shrink rate variability provides high dimensional predictability and permits the slots 60 and other fine features in the distributor plate 20 to be injection-molded with close tolerances on a reliable basis.

Figure 5:
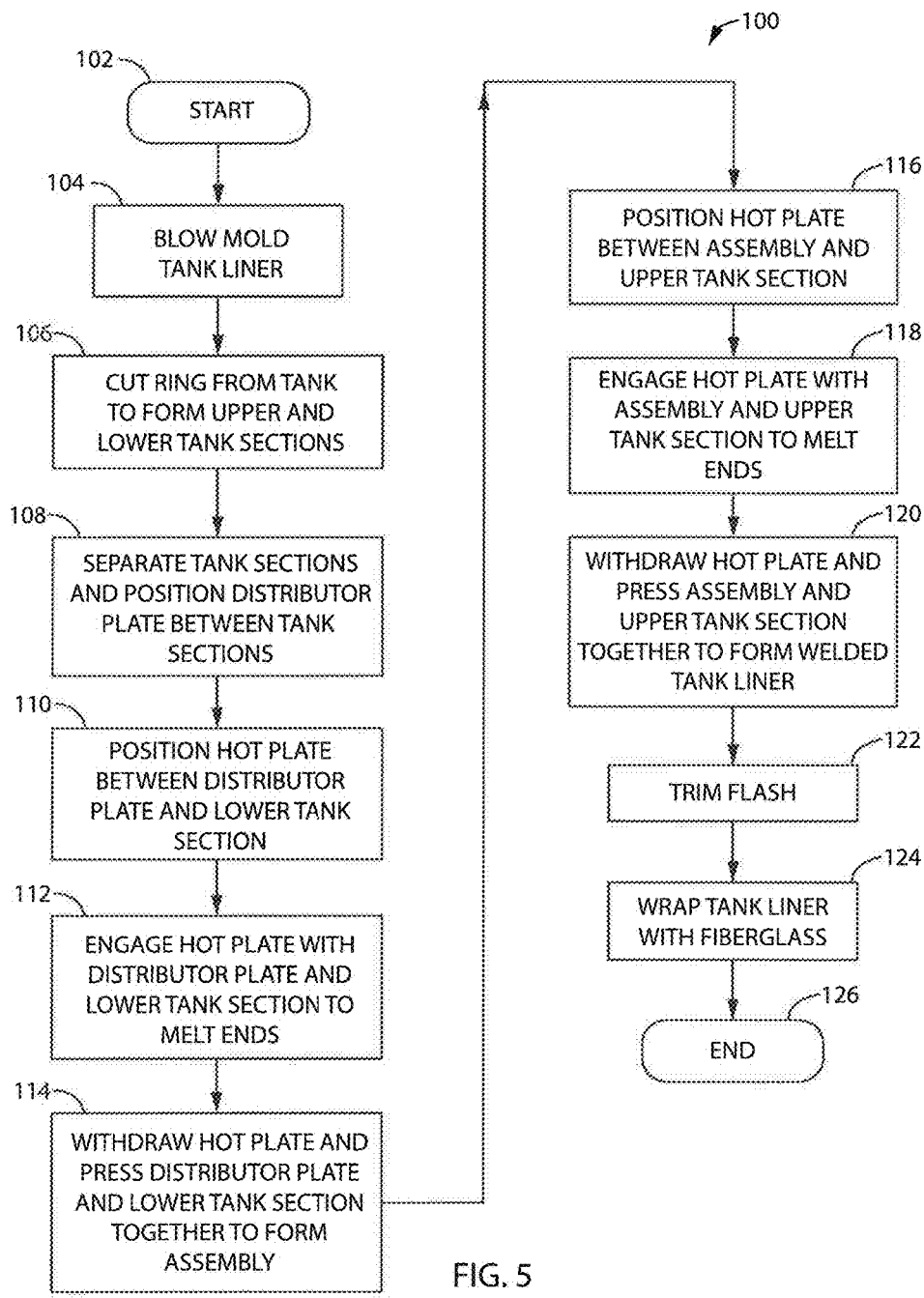
FIG. 5 is a flowchart schematically illustrating a process for making the pressure vessel of FIGS. 1-4.

The pressure vessel 10 can be manufactured via any of a number of processes, including the process designated schematically by the flowchart of FIG. 5. That process 100 begins with START at block 102 and proceeds to block 104, where the tank liner 12 is blow-molded. In this example, the entire tank liner 12, including the body 14 and both ends 16 and 18, is blow-molded at this time. Next, in block 106, a ring is cut out of the liner body 12 near its bottom end 18 while the resulting upper and lower sections of the tank liner 12 are held firmly in place. Then, in block 108, the upper and lower sections of the tank liner 12 are moved axially away from one another, and a pre-assembled distributor plate 20 is positioned between the two tank liner sections. The disk 42 may be retained in place on the ring 40 of the distributor plate 20 at this time by frictional engagement of the outer perimeter of the disk 42 with the inner perimeter of the ring 40 and/or by frictional engagement of the pins 82 with the slots 84 on the ring 40. Alternatively, as discussed above, the disk 42 can be held into the ring 40 by fixturing it on the hot plate bonding machine using elements on the hot plate bonding machine, negating the need for pins or other structures holding the disk and ring together during tank assembly.

Next, in block 110, a hot plate is inserted between the bottom of the ring 40 and the top of the bottom tank liner section 18, and the ring 40 and bottom tank liner section 18 are moved into contact with the upper and lower surfaces of the hot plate in block 112, melting the facing ends of both structures 18 and 40. Then, in block 114, the hot plate is retracted, and the ring 40 and bottom tank liner section 18 are moved axially into engagement with one another so that the melted ends of both structures bond together, producing a ring/bottom tank liner section subassembly having the beads of weld flash 80 seen in FIGS. 3 and 4. Then, after the retaining structure for the ring 40 is released, the hot plate is positioned between the distributor plate/bottom tank liner section subassembly and the upper tank section in block 116, and that subassembly and the tank body are moved into engagement with the lower and upper end surfaces of the hot plate, respectively, in block 118 to melt those end surfaces. Then, in block 120, the hot plate is retracted, and the distributor plate/tank liner bottom section subassembly and the upper tank section are moved axially into engagement with one another, fusing the upper end of the subassembly to the lower end of the upper tank section 14 and producing the flash beads 80. Assembly of the tank liner 12 with the integrated distributor plate 20 is now complete. The weld flash beads 80 can then be trimmed from the outer surface of the tank liner 12 in block 122, and the tank liner 12 can then be wrapped with fiberglass in the usual fashion in block 124. The process then ENDS in block 126.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept.

For example, distributor plates and tanks as described herein could be used to store fluid treatment media other than resin and could be used to treat fluids other than water.

In addition, openings other than or in addition to slots could be formed in the slotted plate portion of the distributor plate, so long as the slotted plate portion is fluid permeable and treatment media impermeable. Such openings include, but are not limited to, circular or non-circular apertures and slits.

In addition, while the tank as show and described herein has a single resin bed and a single distributor plates, other resin beds could be located above or below the illustrated resin bed and supported on other distributor plates, permitting the incorporation of dissimilar treatment media in the same pressure vessel.

The scope of some changes to the described embodiments is discussed above. The scope of other changes to the described embodiments that fall within the present invention but that are not specifically discussed above will become apparent from the appended claims.

What is claimed is:

1. A treatment tank for a fluid treatment system, comprising:
   a tank configured to contain a bed of a fluid treatment media and a fluid, the tank having an at least generally cylindrical wall made of a first polymer material having a shrink rate of greater than 1.5%; and
   a distributor plate received in the tank and separating the bed from a lower end of the tank, the distributer plate including a disk that is made of a second thermoplastic polymer material having a shrink rate of less than 0.7%, wherein the disk is supported on an upwardly facing surface of the treatment tank from below and is restrained from upward motion by a weld bead located above an outer periphery of the disk, whereby radial movement is permitted between the outer periphery of the disk and the cylindrical wall of the tank.

2. The treatment tank of claim 1, wherein the second material has a shrink rate of less than 0.50%.

3. The treatment tank of claim 1, wherein the second material has a shrink rate of less than 0.3%.

4. The treatment tank of claim 1, wherein the second material is a modified polyphenylene ether resin formed from an amorphous blend of polyphenylene ether resin and polystyrene.

5. The treatment tank of claim 1, wherein the first material is an injection-molded high-density polyethylene.

6. The treatment tank of claim 1, wherein the disk of the distributor plate has a plurality of elongated water-permeable but treatment media impermeable slots extending therethrough.

7. The treatment tank of claim 6, wherein, average slot width varies no more than about 0.1 mm within the disk.

8. The treatment tank of claim 1, wherein the tank comprises a liner that is formed from the first material, and wherein the tank liner is reinforced with fiberglass.

9. A treatment tank for a fluid treatment system, comprising:
   a tank configured to contain a bed of a fluid treatment media and a fluid, the tank being formed of a thermoplastic polymer material having an at least generally cylindrical wall; and a distributor plate received in the tank and separating the bed from a lower end of the tank, the distributer plate including a disk that is formed of a thermoplastic polymeric material and that is supported on an upwardly facing surface from below and that is restrained from upward motion by a weld bead located above an outer periphery of the disk, wherein the disk has an inner slotted plate portion and an outer portion, and wherein the outer portion of the disk has an upper surface having an annular protrusion extending above an upper surface of the slotted plate portion, wherein an upper surface of the protrusion forms an engagement surface for the weld bead.

10. A water treatment pressure vessel comprising:
a tank configured to contain a bed of a fluid treatment media and a fluid, the tank including a reinforced tank liner, the tank liner having an at least generally cylindrical wall and being formed of a first thermoplastic material comprising a polyethylene material having a shrink rate of greater than 1.5%; and a distributor plate received in the tank and separating the bed from a lower end of the tank, the distributer plate including a disk that is made of a second thermoplastic polymer material having a shrink rate of less than 0.7%, wherein the disk is supported on an upwardly facing surface of the water treatment pressure vessel from below and is restrained from upward motion by a weld bead located above an outer periphery of the disk, whereby radial movement is permitted between the outer periphery of the disk and the cylindrical wall of the tank liner.

11. The water treatment pressure vessel of claim 10, wherein the disk has an inner slotted plate portion and an outer portion, and wherein the outer portion of the disk has an upper surface having an annular protrusion extending above an upper surface of the slotted plate portion, wherein an upper surface of the protrusion forms an engagement surface for the weld bead.

12. The water treatment pressure vessel of claim 10, wherein the first material is an injection-molded high-density polyethylene.

13. The water pressure vessel of claim 10, wherein the second material is a modified polyphenylene ether resin formed from an amorphous blend of polyphenylene ether resin and polystyrene.

* * * * *